United States Patent [19]

Hermann et al.

[11] 4,208,749
[45] Jun. 24, 1980

[54] FISHERMAN'S PLIERS

[76] Inventors: James R. Hermann, 1728 SE. Lambert St., Portland, Oreg. 97202; Gary S. Amerman, 27500 Wilson River Hwy., Tillamook, Oreg. 97141

[21] Appl. No.: 949,780

[22] Filed: Oct. 10, 1978

[51] Int. Cl.² .................... A01K 69/00; B25F 1/00
[52] U.S. Cl. .................................. 7/106; 7/133
[58] Field of Search .................. 7/106, 132, 133, 134

[56] References Cited

U.S. PATENT DOCUMENTS

| 18,206 | 9/1857 | Lamson . | |
| 276,793 | 5/1883 | Erdman et al. | 7/132 X |
| 318,006 | 5/1885 | Martin . | |
| 572,808 | 12/1896 | Killian . | |
| 1,388,398 | 8/1921 | Adams | 7/133 X |
| 1,431,421 | 10/1922 | Prince . | |
| 1,970,983 | 8/1934 | Smith . | |
| 2,097,735 | 11/1937 | Mrozinski . | |
| 3,597,775 | 8/1971 | McCasland | 7/106 |

*Primary Examiner*—James G. Smith
*Attorney, Agent, or Firm*—Klarquist, Sparkman, Campbell, Leigh, Hall & Whinston

[57] ABSTRACT

A fisherman's pliers combines in a single tool the gripping, holding, compressing and flattening features of a needlenose or similar pliers with a hole punch and with both straight edge and half-moon metal cutters, whereby hollow and solid so-called "pencil lead" sinker material can be prepared efficiently while fishing for attachment as a sinker to a fishing line.

5 Claims, 7 Drawing Figures

FISHERMAN'S PLIERS

BACKGROUND OF THE INVENTION

1. Field of the Invention

The present invention relates to a single multi-purpose pliers-type hand tool of particular use to fishermen for gripping, holding, compressing and flattening things or materials, for punching holes in materials and for cutting malleable or other solid or tubular materials.

2. Description of the Prior Art

While fishing, fishermen often find that they need a tool for grasping and holding hooks, lures and other fishing equipment. Fishermen also frequently need a device for cutting wire leaders, "pencil lead" weights, etc. Many fishermen satisfy these needs by carrying a common needlenose pliers with straight side cutters among their fishing equipment. However, for some purposes such a tool is inadequate.

In drift fishing, fishermen frequently use a type of weight known as "pencil lead", either solid-core pencil lead, which is essentially just lead wire, or hollow-core pencil lead, which is tubular lead wire. Usually, pencil lead comes in rolls and is cut to a length suitable to the needs of fishing a particular water.

There are several means of connecting pencil lead to a fishing line. Hollow-core pencil lead is designed to enable the fisherman to insert the line into the hollow core of the pencil lead and crimp the lead against the line to hold it in place. However, when hollow-core lead is cut to length with the straight-edge cutter on a common needlenose pliers, the hollow core is crimped shut, requiring additional effort and often another tool to reopen the core so that the lead may be used as intended. Although electricians wire strippers in various forms will cut hollow-core lead without crimping it, such a specialized tool has no other use to fishermen.

Solid-core pencil lead is most often attached to fishing line by surgical tubing. One method employs a costly and bulky three-way swivel, which is highly visible to fish, to attach the tubing between the main line and leader. Such an arrangement becomes easily fouled, causing increased loss of terminal tackle, and must be changed whenever the lead diameter is changed. Another method involves passing the line through surgical tubing and inserting the lead, relying on friction to hold the tubing and lead in place. When the lead becomes fouled, however, the tubing slides down the line to the lure, again causing the loss of terminal tackle.

Precut solid-core pencil lead is available which has a hole in one end for tying the lead to the fishing line. This lead is expensive, however, and cannot be snapped to a line or leader with a snap swivel because it is too thick at the hole. Such precut lead is also too short for some purposes and not long enough for others. It would be preferable if the fisherman could, while fishing, cut and form his own solid-core lead with a flattened and punched end for receiving a snap swivel, but no single tool is available for this purpose.

Specialty tools exist which could perform one or more of the above operations. However, to perform all such operations, the fisherman would be burdened with several different tools, which is cumbersome and inconvenient, particularly for making sinkers while fishing. Thus, there is a need for a single tool which combines all of the above-described capabilities and others commonly needed by the fisherman. This need is unsatisfied by the tools of the prior art.

U.S. Pat. No. 18,206 shows a combination tool which includes a punch and features not needed by a fisherman. It has neither the gripping and compressing capabilities of pliers, nor wire-cutting capabilities. It also lacks the capability of cutting hollow-core pencil lead in the manner of the present invention.

U.S. Pat. No. 276,793 includes, in addition to features not shown in the present invention, a pliers, a punch and a wire-cutting means, but does not have the ability to cut hollow-core pencil lead without compressing it. In addition, the tool is inconveniently shaped for the purposes of a fisherman, including carrying it easily while fishing.

U.S. Pat. No. 318,006 shows a combination fuse-cutter capsetter whose utility is limited to the specific purpose of cutting fuses and setting caps. It does not have the capabilities of being used as a pliers or compressing pencil lead or cutting hollow-core pencil lead in the manner provided by the present invention.

U.S. Pat. No. 572,808 covers a tool for miners and blasters' use. Although this tool has pliers-like jaws, it is provided with longitudinal grooves on the jaws' meeting faces and knives are secured therein for cutting fuses and is therefore inadequate for the holding and compressing functions of the present invention. In addition, the punch provided on this tool, like the punch in U.S. Pat. No. 318,006, above, is an awl-like structure unsuited for punching holes in flattened metal.

U.S. Pat. No. 1,431,421 is another blasting fuse implement of specialized design unsuitable for the needs of fishermen. In particular, it lacks both the gripping and compressing capabilities of pliers and it lacks a punch. The straight-edge cutter, the only cutter on this device, is not of a type suitable for cutting metal.

U.S. Pat. No. 1,970,983 refers to a pliers which is actually a form of scissors for cutting and forming a type of electrical conduit. Specialized as it is, the tool will not fulfill the needs of a fisherman, nor does it provide a punch or half-moon cutters.

U.S. Pat. No. 2,097,735 shows a sewing machine tool. Although this tool combines features of pliers, punch and cutting edges, it does so in a specialized manner which provides for cutting and punching belts in a simultaneous mode. It provides neither the half-moon cutters needed for cutting hollow-core pencil lead nor tapered needle-nose jaws with scored surfaces suitable for gripping fishhooks. In addition, the punch appears to be unsuitable for punching lead sinker material.

There is a fencing pliers (no known patent) which is designed for use in construction of wire fences. It combines special pliers jaws for pulling fence staples, a hammer on the outer side of one jaw, and a staple-pulling hook on the outer side of the other jaw, wire shears adjacent to the pivot and means for grasping wire between the handle adjacent to the pivot so that wire may be stretched around a fence post. Fence pliers lack both the punch and half-moon cutters of the present invention. In addition, the pliers jaws are unsuited for grasping hooks and other fishing equipment.

Accordingly, there is a need for a combination tool for fishermen, which provides the gripping and compressing capabilities of a needle-nosed or similar pliers with both straight-edge and half-moon cutters and with a punch. Further, there is a need for these capabilities to be combined in a single light-weight tool which is easily carried and used by fishermen while fishing.

SUMMARY OF THE INVENTION

The present invention is a fisherman's pliers having elongated tapered jaws with a flat inner meeting face on each jaw which is suitable for grasping or holding objects or for compressing objects between flat surfaces in the jaws. The tool also features a straight-edge cutter and a half-moon cutter suitable for cutting hollow-core pencil lead without destroying the hollow characteristics of the lead. The tool also features a punch suitable for punching a variety of materials, including malleable metal.

The objects of the invention include:

1. The ability to firmly grasp and hold hooks, lures, leaders and other fishing devices;
2. the ability to compress or flatten pencil lead sinker material and other malleable materials;
3. the ability to cut solid-core pencil lead, leaders, wire and hooks;
4. the ability to cut hollow-core pencil lead without closing the hollow core;
5. the ability to punch holes in flattened pencil lead and other materials; and
6. combining all the above-described capabilities in a single tool which may easily be carried in a tackle box, creel or pocket.

The foregoing objects, features and advantages of the present invention will become more apparent in the following detailed description which proceeds with reference to the accompanying drawing.

DETAILED DESCRIPTION OF PREFERRED EMBODIMENTS

FIG. 1 Embodiment

Figure 1:
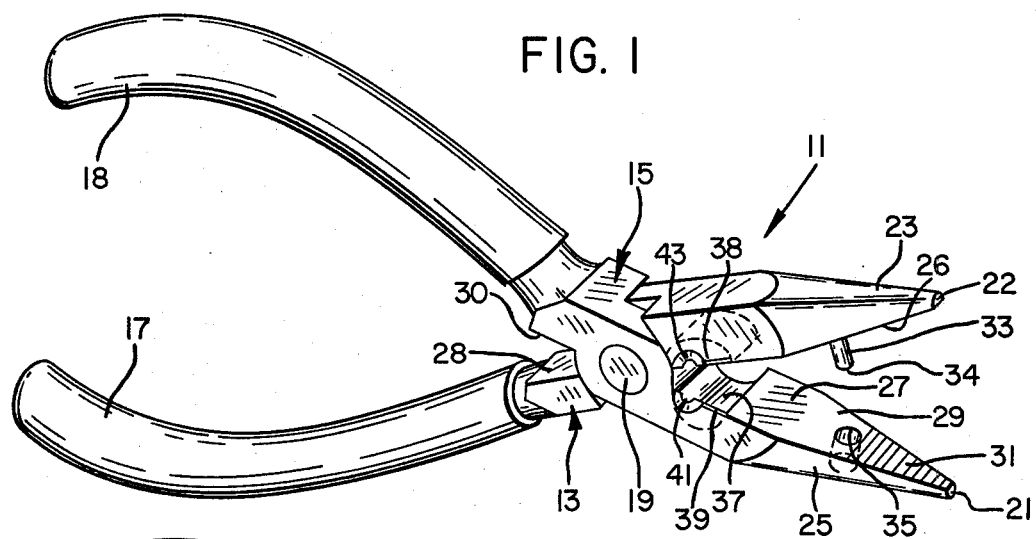
FIG. 1 shows a perspective view of the preferred embodiment of fisherman's pliers.

In the drawing, FIG. 1 shows a needle-nosed fisherman's pliers 11 comprising two mutually-pivotable crossed members 13, 15, each including a handle section 17, 18, respectively, and a needle-nosed jaw section 23, 25, respectively. The members 13, 15 intersect at a pivot 19.

The jaw section 25 of member 15 has, proceeding from a flat tip 21 toward the handle section 18, a flat meeting face 27 comprising a grooved or checkered gripping surface portion 31, and a die hole 35 within a smooth compression surface portion 29. Continuing toward the handle section 18, jaw section 25 includes a straight-edge cutter 39, a half-moon cutter 41, the pivot 19, and, on the handle side of such pivot, a second smooth flat surface portion 30 (not shown) lying adjacent to handle section 18.

Similarly, jaw section 23 of member 13 has features cooperative with the aforementioned features of jaw section 25, as follows, proceeding from its tip 22 toward its handle 17: a flat meeting face 26 having a grooved or checkered gripping surface portion (not shown) and a smooth compression surface portion (not shown) in positions corresponding to the positions of like portions of jaw section 25 for cooperation therewith; a cylindrical punch pin 33 having a flat head 34 projecting generally normally from the meeting face 26 and sized and positioned for cooperation with die hole 35; a straight-edge cutter 38 for cooperation with cutter 39; and a half-moon cutter 43 for cooperation with similar cutter 41. A second smooth flat surface portion 28 lies rearwardly of pivot 19 adjacent to handle section 17.

Figure 3:
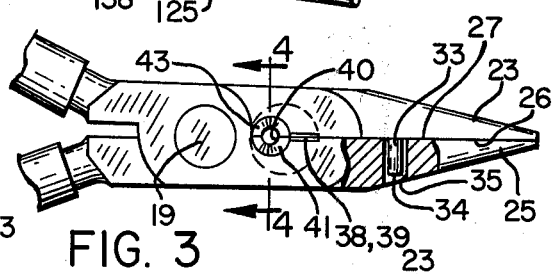
FIG. 3 shows the jaws portion of the pliers of FIG. 1 in side elevation.

Referring to FIG. 3, the cylindrical die hole 35 extends inwardly through the jaw section 25 from meeting face 27 and normal to the flat meeting face 27 through jaw section 25. It is positioned in jaw section 25 so as to receive the punch pin 33 when jaw sections 23, 25 are closed, so that pin 33 and hole 35 cooperate to form a punch 33, 35. In the preferred embodiment pin 33 and hole 35 are positioned on their respective meeting faces 26, 27 opposite their respective handle sections 17, 18 approximately two-thirds of the distance from the axis of pivot 19 to pliers tips 21, 22 and are centered laterally. For greater leverage, the punch 33, 35 may be placed closer to pivot 19 or placed on the second flat surface portions 28, 30 adjacent to the handles 17, 18. Any references herein to the meeting faces 26 and 27 shall be deemed to include the flat surface portions 28 and 30, respectively.

For punching flattened lead it is unnecessary for the punch pin 33 to fit tightly into the die hole 35. Therefore, in the preferred embodiment, the punch 33, 35 is constructed to loose tolerances enabling the straight-sided punch pin 33 to enter the straight-sided die hole 35 without conflict when the jaw sections are closed together. This feature enables pliers 11 to be simply and inexpensively manufactured.

Figure 4:
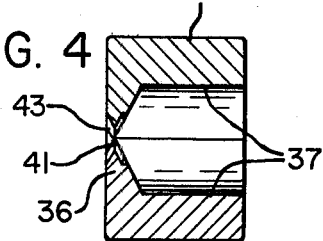
FIG. 4 shows a cross section of the jaws of FIG. 3 taken along the plane 4—4.

Referring to FIG. 4, each of the jaw sections 23, 25 contains a semi-cylindrical channel 37 immediately adjacent to the pivot 19 whose axis parallels the axis of pivot 19. The channels 37 extend along their axes almost through their respective jaw sections 23, 25, leaving a thin wall 36 along one side of each jaw section 23, 25. The edge of each wall 36 at the meeting face 26, 27 of each jaw section 23, 25 is sharpened to form the straight-edge cutters 38, 39, best seen in FIG. 1.

In FIGS. 3 and 4, at the line 4—4, a circular hole 40 has been drilled through the portion of the straight-edge cutters 38, 39 nearest the pivot 19 such that a diameter of the hole 40 lies along the straight-edge cutters 38, 39. The hole 40 is then countersunk about its axis from both sides of the walls 36 by drilling the walls 36 to a depth sufficient to provide sharp half-moon cutting edges 41, 43 in each jaw section 23, 25, as shown in FIG. 4. Alternatively, the hole 40 can be countersunk from only one side of the walls 36 to obtain sharp, half-moon cutting edges 41, 43 by drilling the walls 36 to a slightly greater depth than is shown in FIG. 4, thereby simplifying manufacture of fisherman's pliers 11.

FIG. 2 Embodiment

Figure 2:
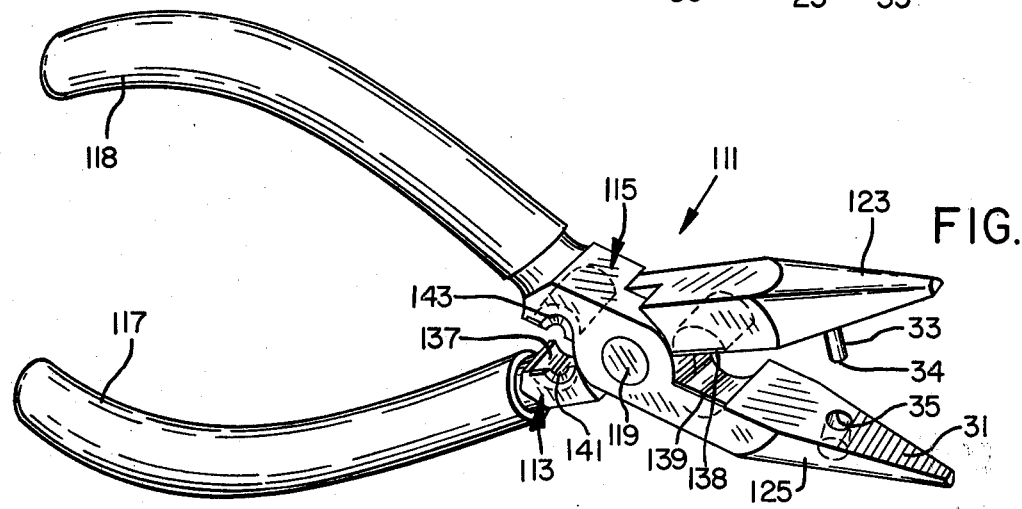
FIG. 2 shows, in perspective, an alternative preferred embodiment of fisherman's pliers.

FIG. 2 shows an alternative embodiment of fisherman's pliers 111. Pliers 111 are essentially the same as pliers 11 except that a channel 137 similar to the channel 37 of FIGS. 1, 3 and 4 is provided in each member 113, 115 between the pivot 119 and the handles 117, 118 in lieu of the second flat surface portions 28, 30. The walls 136 are drilled and countersunk to form half-moon cutters 141, 143 essentially identical to the half-moon cutters 41, 43 of pliers 11. Placing the half-moon cutters 141, 143 on the handle side of the pivot 119 has the advantage of leaving a somewhat longer straight-edge cutter 138, 139 on the opposite side of pivot 119. This arrangement also makes it slightly easier for the user to align objects in the pliers 111 for cutting.

Fisherman's pliers 11 or 111 are sized to fit comfortably in a fisherman's pocket or creel. In one example, the length of such pliers 11 or 111 is 6½ inches.

OPERATION

In operation, fisherman's pliers 11 or 111 may be used in any manner in which ordinary needle-nose or similar pliers would be used.

Figures 5, 6:
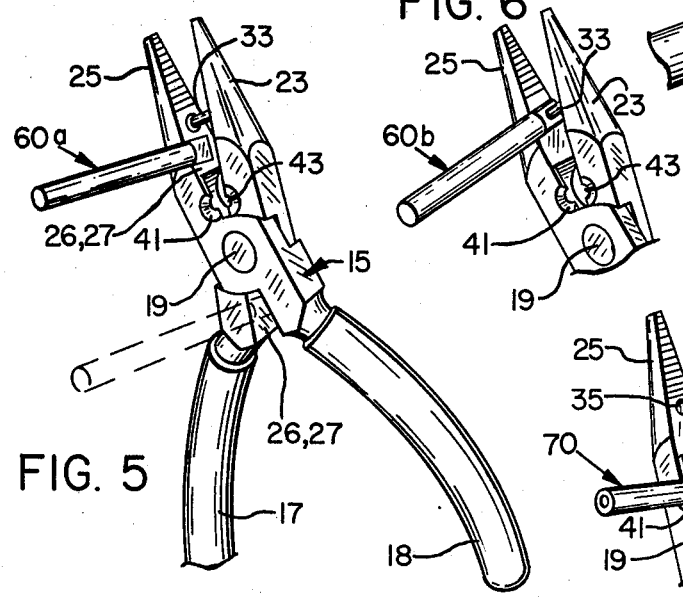
FIG. 5 shows the pliers of FIG. 1 in use to flatten pencil lead in two alternative positions in the pliers.
FIG. 6 shows the pliers of FIG. 1 in use to punch a hole in flattened pencil lead.

In addition, such pliers may be used for cutting solid-core pencil lead sinkers 60 using the straight-edge cutters 38, 39. Sinkers 60a are then flattened at the end by compressing the sinker 60a between opposed flat smooth surface portions of the meeting faces 26, 27 in the pliers 11, as shown in FIG. 5. Once the lead is flattened, a hole in the sinker 60b is created in the flattened region by use of the punch 33, 35, as shown in FIG. 6. Thereafter sinker 60b can be snapped through its hole to a small snap swivel, which in turn is tied into the fishing line, preferably with the line and leader knotted to opposite eyelets of the swivel.

Figure 7:
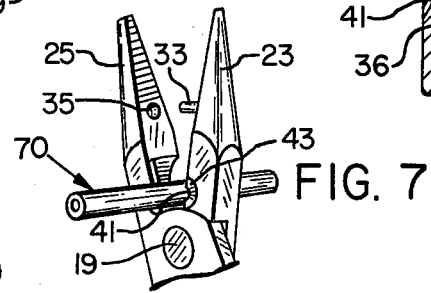
FIG. 7 shows the pliers of FIG. 1 in use to cut hollow-core pencil lead.

Hollow-core pencil lead 70 is cut by placing it between the half-moon cutter 41, 43 and compressing the handles 17, 18 as shown in FIG. 7. Fishing line is inserted into the hollow core of the pencil lead 70 and then clamped in place by compressing the end into which the line has been inserted between opposing meeting faces 26, 27 of pliers 11.

Having illustrated and described the principles of our invention by what is presently, a preferred embodiment thereof, and alternative embodiments, it should be apparent that such embodiments may be modified in arrangement and detail without departing from such principles. We claim all such modifications within the true spirit and scope of the following claims.

What is claimed is:

1. A fisherman's pliers comprising:
   two crossed members rotationally pivoted at their intersection to form a pliers, each member comprising a jaw section and a handle section;
   each jaw section having a planar meeting face, a straight-edge cutter, and a half-moon cutter arranged for cooperative action with corresponding portions of the other jaw section; and
   one jaw section having a punch pin, and the other jaw section having a die hole sized and positioned for receiving said pin when said jaw sections are closed together, thereby defining a punch;
   said planar meeting faces rotating between an angularly spaced relationship and a substantially parallel abutting relationship with one another upon pivoting movement of said two crossed members;
   said punch pin and die hole being positioned on the planar meeting faces of said jaw sections and constructed to interfit without conflict as said jaw sections are rotated toward one another.

2. A fisherman's pliers according to claim 1 in which said planar meeting faces and said punch are longitudinally offset from said cutters such that an elongated portion of malleable metal can be compressed and flattened between said meeting faces and can be punched without interference from said cutters when said jaw sections are closed.

3. A fisherman's pliers according to claim 1, wherein:
   said jaw sections include jaws which are elongated and tapered inwardly from a large dimension near the pivot to a smaller dimension at the tips of said jaw sections;
   each of said planar meeting faces includes a smooth surface portion and a scored gripping surface portion, said surface portions oriented on said meeting faces so that like surface portions are mutually opposed and approximately parallel to one another when said pliers are closed, the scored gripping surface portion extending to the tips of the jaw sections;
   said straight-edge cutters parallel said meeting faces of said jaw sections and contact each other when said pliers are closed;
   said half-moon cutters are sized and positioned so that malleable tubular material of a predetermined diameter range may be cut without destroying its tubular characteristics;
   said planar meeting faces are arranged with respect to said punch and cutters so that malleable material may be compressed and flattened between said faces when said jaw sections are closed without simultaneously cutting or punching said material;
   said die hole of said punch extends through its respective jaw section to enable material removed from punched holes to be pushed through said die hole; and
   said punch pin and die hole are cylindrical in shape and have straight sides extending generally normally from their respective meeting faces;
   said punch pin being of sufficient strength to enable its use in punching holes in flattened malleable metal;
   said die hole and punch pin being constructed to loose tolerances so that the punch pin does not conflict with the sides of the die hole when the jaw sections are rotated toward one another.

4. A fisherman's pliers according to claim 3 wherein the features of said jaw sections are arranged from the tip of said jaw sections as follows:
   (a) scored surface portion;
   (b) punch;
   (c) smooth surface portion;
   (d) straight-edge cutters;
   (e) half-moon cutters;
   (f) pivot; and
   (g) smooth surface portion.

5. A fisherman's pliers according to claim 3 wherein the features of said jaw sections are arranged from the tip of said jaw sections as follows:
   (a) scored surface portion;
   (b) punch;
   (c) smooth surface portion;
   (d) straight-edge cutters;
   (e) pivot; and
   (f) half-moon cutters.

* * * * *